(12) United States Patent
Mandralis et al.

(10) Patent No.: US 8,062,682 B2
(45) Date of Patent: Nov. 22, 2011

(54) BEVERAGE INGREDIENT CONTAINING CAPSULE HAVING SEVERAL COMPARTMENTS

(75) Inventors: Zenon Ioannis Mandralis, Chexbres (CH); Jean-Paul Denisart, La Conversion (CH); Tony Ward, York (GB); Julien Gaillard, La Conversion (CH)

(73) Assignee: Nestec S.A., Vevey (CH)

( * ) Notice: Subject to any disclaimer, the term of this patent is extended or adjusted under 35 U.S.C. 154(b) by 323 days.

(21) Appl. No.: 12/093,292

(22) PCT Filed: Nov. 6, 2006

(86) PCT No.: PCT/EP2006/068121
§ 371 (c)(1),
(2), (4) Date: Jul. 1, 2008

(87) PCT Pub. No.: WO2007/054479
PCT Pub. Date: May 18, 2007

(65) Prior Publication Data
US 2008/0317931 A1    Dec. 25, 2008

(30) Foreign Application Priority Data
Nov. 10, 2005   (EP) .................................. 05024566

(51) Int. Cl.
B65D 81/32    (2006.01)
A23F 5/24    (2006.01)
A47J 31/40    (2006.01)

(52) U.S. Cl. .............. 426/119; 426/77; 426/78; 426/79; 426/80; 426/594; 426/595; 206/219; 206/295; 206/524; 99/295

(58) Field of Classification Search .............. 426/77–79, 426/119, 594–595; 99/295
See application file for complete search history.

(56) References Cited

U.S. PATENT DOCUMENTS

| 2,976,155 | A | * | 3/1961 | Heller | 426/284 |
| 3,695,894 | A | * | 10/1972 | Hum | 426/241 |
| 4,136,202 | A | * | 1/1979 | Favre | 426/77 |
| 4,775,048 | A | | 10/1988 | Baecchi et al. | 206/0.5 |

(Continued)

FOREIGN PATENT DOCUMENTS
DE    198 38 631    3/2000
(Continued)

OTHER PUBLICATIONS

International Search Report for PCT/EP2006/068121 Dated 3/30/07.

*Primary Examiner* — Rena Dye
*Assistant Examiner* — Daniel M Propster
(74) *Attorney, Agent, or Firm* — Winston & Strawn LLP

(57) ABSTRACT

A method for producing a beverage or liquid comestible from a single capsule by subdividing the interior of the capsule into a plurality of compartments, at least two compartments containing beverage-forming ingredients, introducing a liquid into one of the compartments of the capsule and starting to produce and drain a first beverage component on the basis of the ingredient contained in the first compartment, and opening a fluid communication between the first and the second compartment such that after the start of the production of the first beverage compartment, a production of a beverage component on the basis of the ingredient contained in the second compartment commences. The capsule is preferably used to make cappuccino-style beverages.

25 Claims, 2 Drawing Sheets

U.S. PATENT DOCUMENTS

| | | | |
|---|---|---|---|
| 4,826,695 A | 5/1989 | Tanner | 426/77 |
| 5,554,400 A * | 9/1996 | Stipp | 426/78 |
| 6,758,130 B2 | 7/2004 | Sargent et al. | 99/295 |
| 6,805,041 B2 | 10/2004 | Colston et al. | 99/295 |
| 2003/0059501 A1 * | 3/2003 | Rivier | 426/103 |
| 2006/0051475 A1 * | 3/2006 | Fornaguera et al. | 426/516 |

FOREIGN PATENT DOCUMENTS

| | | |
|---|---|---|
| DE | 198 38 637 A1 | 3/2000 |
| EP | 0 245 575 | 11/1987 |
| EP | 449 533 A1 | 10/1991 |
| EP | 615 921 A1 | 9/1994 |
| FR | 1 503 185 | 11/1967 |
| GB | 2 372 735 | 9/2002 |
| GB | 2372735 A * | 9/2002 |
| WO | WO 95/07648 | 3/1995 |
| WO | WO 96/08153 | 3/1996 |
| WO | WO 97/33482 | 9/1997 |
| WO | WO 98/07329 | 2/1998 |
| WO | WO 99/40829 * | 8/1999 |
| WO | WO 99/58035 | 11/1999 |
| WO | WO 2004/026091 | 4/2004 |
| WO | WO 2004/071899 | 8/2004 |

* cited by examiner

BEVERAGE INGREDIENT CONTAINING CAPSULE HAVING SEVERAL COMPARTMENTS

This application is a 371 filing of International Patent Application PCT/EP2006/068121 filed Nov. 6, 2006.

BACKGROUND

The present invention generally relates to the production of a beverage (e.g. cappuccino, latte macchiato) or a liquid comestible from a capsule, pod, bag or other ingredient-containing container.

Thereby the invention relates to those ingredient-containing containers only which can be placed into a machine (such as e.g. a beverage dispensing machine) in order to have a liquid (usually water) enter the interior of the container.

In the following the background of the invention will be explained referring to a capsule. It is to be understood that the example of the capsule has been chosen as a representative for an ingredient-containing container to be inserted in a beverage or liquid comestible producing machine.

The capsule contains at least one beverage or comestible ingredient. When the ingredient inside the capsule is made to interact with a liquid, for example hot water which is introduced into the interior of the capsule, a beverage can be produced by an interaction of the liquid with the ingredients contained in the capsule. This beverage can then be drained from the capsule.

There is a wide range of possible interactions between the beverage/comestible ingredient(s) and liquid, such as for example extraction, dissolution, brewing, mixing, etc., all of which are encompassed by the present invention even if the following description will focus only on a few of them for illustration purposes.

Typical representatives of such capsules are sealed capsules containing roasted ground coffee powder. Such capsules can be inserted in adapted coffee brewing machines. Once inserted into the coffee brewing machine, water is introduced in the capsule such that the water interacts with the coffee powder contained in the capsule. As a result thereof a coffee beverage is produced, which is outpouring from the capsule and delivered into a recipient (such as a mug, glass, or other) to make the beverage.

Consumers have widely appreciated the convenience of such a beverage production, which is a clean and quick beverage making process and which can be carried out with simple handling; namely essentially consisting of inserting the sealed coffee powder containing capsule in a beverage machine and pressing a button.

Now, especially in the case of coffee specialties (e.g. cappuccino, latte macchiato, or similar beverages) the consumers greatly appreciate the authenticity imparted onto the final beverage cup or glass by the three following elements:
a. The white milk froth covering the top of the beverage,
b. The "stain" of brown coffee marking the spot on the white milk froth phase from where the coffee has been added to the cup, and
c. In the case of a glass receptacle (typical for e.g. latte macchiato as served in bars in Germany), the appearance of three layers with different colours i.e. white at the bottom (liquid milk), brown in the middle (coffee extract), and white (milk froth) on the top.

A single prior art capsule can not deliver a two-phase, multi-layered product whereby two liquid portions coming from two different ingredients are dispensed at different times, for example, to produce a beverage with a milk phase and a coffee phase.

Now, there is a need for a production of beverages which comprises at least two beverage components which are to be produced and filled into a receptacle not simultaneously, but according to a defined time sequence, i.e. at different time periods during the beverage dispensing cycle. A typical example of such a beverage having several sequentially delivered beverage components is cappuccino-style coffee. In order to produce a cappuccino-style coffee, at first milk foam or milk froth is introduced into the receptacle, and only after a certain time period with regard to the start of the milk foam/milk froth filling, a coffee beverage ingredient is poured into the receptacle.

Therefore, according to the prior art, in order to produce, e.g. a cappuccino-style coffee, at first a milk powder or liquid milk containing capsule is inserted, which has then to be replaced by a coffee powder containing capsule. However, this way of preparing a cappuccino-style coffee is not convenient, time consuming as it requires the use of two different capsules.

SUMMARY OF THE INVENTION

The object of the present invention thus is to enlarge the range of beverages or beverage components which can be produced from a single capsule.

According to the present invention, this object is achieved by means of the features of the independent claims. The dependent claims develop further the central idea of the present invention.

The invention proposes, among others, a beverage capsule able to produce a beverage containing more than one beverage component or phase, which plurality of beverage components or phases is capable of being drained from the capsule with a certain delay between the start of the delivery of each of said beverage component or phase.

According to an aspect of the present invention a capsule containing at least one beverage ingredient is proposed. The interior of the capsule is sub-divided into at least a first and second compartments, each compartment containing a beverage ingredient or a mix of beverage ingredients.

Thereby a second compartment can surround (enclose) a first compartment.

The first compartment, surrounded by the second compartment comprises a wall which is configured to dissolve, break or open under the effect of the fluid entering the capsule.

According to an embodiment the wall can be made of a sugar material such as e.g. hard candy.

The first compartment can contain soluble coffee powder or liquid concentrate. The second compartment can contain milk powder or liquid concentrate or another (dairy or non dairy) creamer in powder or liquid form.

If the first compartment contains a coffee ingredient and the second compartment contains milk powder or liquid concentrate, a cappuccino-style beverage can be produced, wherein the milk product production can commence before the coffee product beverage component starts to dispense. As a result, a separate froth milk layer, and a multi-layered aspect can be produced in the receptacle.

Note that the invention also relates to beverages in which the at least two different beverage components are not separated from each other, i.e. that overlap or mix together at least partially in the recipient.

The volume and/or weight of the ingredient contained in the second compartment can be higher than the volume and/or weight of the ingredient in the first compartment. The two compartments can optionally be separated from each other by a wall which is designed to open a fluid communication between the two compartments when interacting with a liquid introduced into the interior of the capsule.

There are several possibilities to perforate such a wall or to have such a wall, at least partially, disappear. An illustrative example for such a possibility is an at least partial dissolution of the wall. Apart from mechanical/physical means the present invention particularly proposes walls which dissolve, rupture, or melt when interacting with water introduced into the interior of the capsule.

The thickness of the wall can be, for example, at least 0.5 mm, preferably 1 to 5 mm.

The thickness of the wall can vary over its extension.

The wall can contain polysaccharides, which can be a mixture of glucose syrup and sucrose.

The sugar can be a hard candy.

Hard candy, sometimes also called "high-boiled sweet", has a hard texture, glassy appearance and is usually produced from a sugar and glucose syrup base. Hard candy is a super-cooled liquid at ambient temperature with a solids content above 96% by weight. Sugar replacers can also be used such as e.g. isomalt, lactitol, maltitol or hydrogenated starch hydrolysates. In particular, for a better control of the properties of resistance of the wall (i.e., a higher resistance to cracking during manufacturing), the wall may additionally contain maltodextrin.

The wall can be for example the hard shell of a centre-filled item. If the hard shell is produced from hard candy, a centre filling technology as known from sugar confectionery manufacture can be used.

The wall can contain at least 1%, preferably more than 2% by weight of moisture. This moisture content is preferred in order to reduce the risk of the wall breaking during the operation of filling the first compartment with a beverage ingredient.

The total volume of the capsule can range between 20 ml and 60 ml.

The capsule can contain a total of between 8 grams and 30 grams of ingredients.

A further aspect of the present invention relates to a method for producing a beverage-containing capsule having these two separate compartments, especially a capsule as set forth above. The method thereby comprises the step of centre-filling of a shell with a beverage ingredient in order to produce a first compartment containing a beverage ingredient. This first-filled compartment is then arranged inside a capsule, the volume of the capsule surrounding the first compartment representing a second compartment which can be filled with another beverage ingredient.

In order to carry out the centre filling, a batch former with powder filler can be used, such as available on the market from the companies R. Bosch GmbH or Nuovo Euromec.

A further aspect of the present invention relates to a method for producing a beverage or liquid comestible for a capsule, the method comprising the following steps:

At first, a capsule is provided, the interior of which is sub-divided into a plurality of compartments, wherein at least two compartments contain an ingredient or an ingredient mix;

A liquid, such as for example hot pressurised water is introduced into one of the compartments of the capsule in order to start the production and draining of a first beverage component on the basis of the ingredient contained in the first compartment;

When a fluid communication is opened between the first and the second compartment, with some delay after the start of the production of the first beverage compartment the production of a beverage component on the basis of the ingredient contained in the second compartment will commence.

Initially the first and the second compartment can be separated from each other by a wall which perforates or dissolves or disperses when exposed to the liquid introduced into the capsule.

A further aspect of the present invention relates to a method for producing a cappuccino-style beverage from a single capsule, the capsule containing at least a first compartment containing a milk ingredient and a second compartment containing a coffee ingredient.

At first water is introduced into the capsule. Then the production of first beverage component is started on the basis of the milk ingredient. With some delay after the start of the production of the first beverage component, the production of the beverage component on the basis of the coffee ingredient can be initiated. The process is particularly adapted for producing a cappuccino-styled beverage having at first a milk beverage component and then a coffee beverage component respectively dispensed into a receptacle, such as for example a beverage cup.

BRIEF DESCRIPTION OF THE DRAWINGS

Further aspects, objects and advantages of the present invention will become evident for the man skilled in the art when reading the enclosed detailed explanation of embodiments of the present invention, taken in conjunction with the figures of the enclosed drawings.

DETAILED DESCRIPTION OF THE PREFERRED EMBODIMENTS

As already explained in the opening section of the present description, the invention proposes a single capsule from which different beverage components (phases) can be produced according to a planned time sequence, thus enlarging the potential range of products which can be produced from a single capsule. Although the "time sequence" has not to be predefined in a highly precise manner, the design of the capsule has to be such that the beverage production of a first component is started before the delayed beverage production on the basis of at least one further ingredient contained in the capsule.

Although the term "capsule" is used in the specification and in the claims, it is to be understood that in the framework of the specification and claims this term is meant to also encompass bag-like containers which are at least partially made of walls which allow a liquid to enter. These bags are thus comparable to well-known tea-bags. These bags are also called "pods" or "pouches", and do not have to be opened as their walls are designed to let a liquid flow through.

There can be overlap between the production time periods of different ingredients; no strict separation is necessary.

In the following it is assumed for purely illustrative purposes that the two-phase beverage is a cappuccino-style coffee for which at first a milk product is to be poured into a receptacle, before a coffee component is produced and poured into the receptacle. It is to be understood that there is a much broader field of application for a capsule and a method according to the present invention that there are many more beverages and/or liquid comestibles (soup etc.) where the time-delayed production of several components based on a single capsule may constitute an advantage.

Note that the ingredient(s) can be in any form, such as e.g. in solid, powdered, particulate, viscous or liquid form as well as mixtures thereof.

In the following it is to be understood that the expression "ingredient" does not only relate to single-source ingredients, but also encompasses mixtures of a least two substances.

Figure 1:
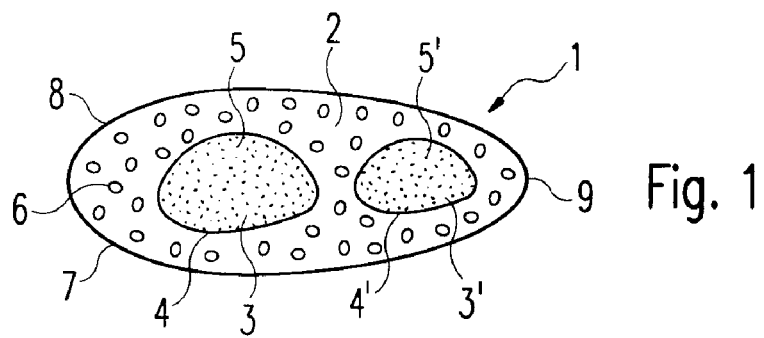
FIG. 1 shows a first embodiment of a capsule according to the present invention, wherein one space (compartment) encloses at least one further compartment.

The capsule 1 shown in FIG. 1 has an outer wall which is constituted of a lower half 7 and an upper half 8 which are sealed to each other at a rim portion 9. Note that many variations of the outer shape and/or design of the capsule 1 are possible, as long as the outer surface of the capsule can enclose an inner volume for containing the beverage ingredients.

The embodiment shown in FIG. 1 is sub-divided in several compartments. In the example a total of three sub-compartments, i.e. a main compartment 2 and two further compartments 3, 3' which are surrounded by the main compartment 2. It goes without saying that the number of compartments (see FIG. 1) can vary, as long as more than one is provided in the volume of the capsule 1.

The term "main compartment" does not necessarily designate the biggest compartment, but the compartment in which initially the liquid is introduced and in which, in turn, the beverage production will usually start.

According to the invention at least two compartments out of the total number of compartments in the capsule 1 do contain an ingredient or a mix of ingredients.

Ingredients contained in the different compartments can be different or the same. They can be different chemically and/or physically (i.e. the same ingredient, but in a physically different form, such as e.g. compacted in contrast to a loose form).

In the example shown the compartments 3, 3' surrounded by the main compartment 2 of the capsule 1 respectively contain the same beverage ingredient 5, 5', which is however assumed to be different to the beverage ingredient 6 contained in the main compartment 2 in the capsule 1.

The separating wall 4, 4' for sub-dividing the interior of the capsule 1 in the different compartments can also constitute a beverage or liquid comestible ingredient.

The separating wall can have a compound or multilayer structure comprised of layers of differing materials. E.g. it is possible to coat a sugar-based layer of the wall with a fat-containing layer on one side or on both sides. The fat layer can have the advantage to protect the sugar-based layer from degradation due to an undesired interaction with the surrounding media during storage, i.e. before the water is injected.

Separation walls made up from more than two or three layers are possible.

Note that the outer walls 7, 8 of the capsule 1 can be made of water impermeable material(s) and/or water permeable material(s). For instance, the outer walls can be made of water impermeable material(s) such as aluminium, plastics, aluminium/plastic laminate and/or water permeable material(s) such as filter paper or any combination thereof.

Figure 2:
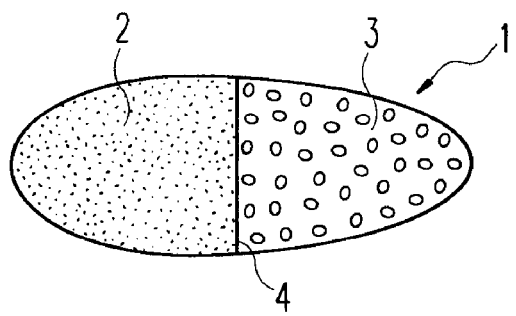
FIG. 2 shows a further embodiment of a capsule according to the present invention, according to which at least two compartments are arranged one next to the other.
Figure 3:
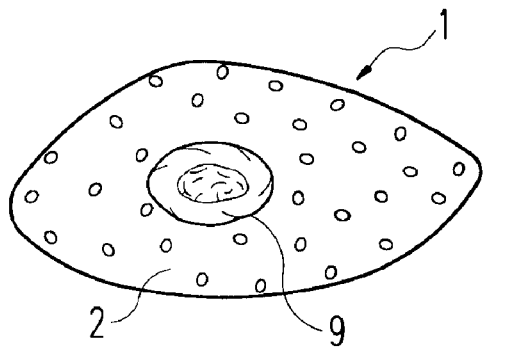
FIG. 3 shows a still further embodiment of the invention, according to which the outer surface of an ingredient constitutes the separation wall for delaying the liquid-interaction with said ingredient.

A sealed capsule 1 as shown in FIGS. 1 to 3 can be inserted in beverage production devices which are known as such from the prior art, e.g. such a capsule 1 can be placed on a capsule holder before the beverage production device is put in a beverage production state. To this regard e.g. by perforating the upper half 8 of the capsule 1 typically hot pressurised water is injected into the volume of the capsule 1 and to be more detailed into the main compartment 2 of the capsule 1.

The hot pressurised water will start interacting with the beverage ingredient contained in the main compartment 2.

Before, during or after the start of the liquid injection into the interior of the capsule 1 one or more openings e.g. in the lower half 7 of the capsule 1 can be produced from which a beverage or beverage component can be drained from the capsule 1.

In any case, as soon as water enters the interior of the capsule 1, it will start interacting with the beverage ingredient 6 contained in the main compartment 2. However, at the beginning of the introduction of water, water will not be able to interact with the beverage ingredient(s) 5, 5' contained in the sub-compartments 3, 3' due to the presence of the separation walls 4, 4'.

While the interaction water/ingredient in the main compartment 2 takes place, a beverage component (being the result of said interaction) is drained from the capsule 1 before a fluid communication between the main compartment 2 and the interior of the sub-compartments 3, 3' is opened. Draining of said beverage component from the capsule 1 can result through the opening of the lower half 7 of the capsule by mechanical means. For example, the pressure that builds up in the main compartment 2 of the capsule 1 can cause the lower half 7 of the capsule to tear, perforate or otherwise open.

The interior pressure of the main compartment may also contribute directly or indirectly to a delayed opening of the separation walls 4, 4'. For instance, the said interior pressure may cause the separation walls 4, 4' to increase their dissolution or otherwise tear, perforate or break etc.

According to a preferred embodiment of the present invention the separation walls 4, 4' between the compartments 2, and 3, 3', respectively, are designed such that they dissolve at least partially when being in contact with a liquid and especially with hot pressurised liquid such as water. Therefore, while the interaction with the beverage ingredient 6 and main compartment 2 is going on and a beverage based on these ingredients 6 is already drained from the capsule 1, the water injected into the main compartment 2 will also come into contact with the beverage ingredient(s), 5, 5' contained in the sub-compartments 3, 3' and correspondingly, with a certain delay with reference to the beverage production based on the ingredient(s) of the main compartment 2, also a production of a beverage component based on the ingredients 5, 5' of the further sub-compartments 3, 3' will commence.

As a result after a certain time period after the start of the production of the first beverage component of the ingredient 6 contained in the main compartment 2, a second beverage component based on the ingredients 5, 5' contained in the sub-compartments 3, 3' or eventually a mixture of ingredients 5, 5' and ingredient 6 will be produced and subsequently drained through the lower half shell 7.

If at the time of the start of the interaction of the water and the ingredients 5, 5' in the sub-compartments 3, 3' the interaction between the water and the ingredients 6 and the main compartment 2 is already exhausted, the beverage drain from the capsule 1 will not change to a mixture, but to a "pure" beverage component on the basis of the ingredients 5, 5' contained in the sub-compartments 3, 3'.

FIG. 2 shows a different sub-division of the interior of the capsule 1, in which one compartment is not surrounding another compartment, but two compartments 2, 3 separated by a wall 4 are placed adjacent to each other. The water will at the beginning be injected into the subspace 2 of FIG. 2, in which the beverage component production will commence and the beverage will start being released from the capsule 1 before the water is allowed to flow into the second compartment 3, such that the production of a second beverage component can also start from there and then be released from the capsule with a certain delay vis-a-vis the start of the release of the first beverage component.

In an embodiment shown in FIG. 3 the ingredient(s) of the compartments 3, 3' can be treated such that the outer surface 9 forms a solid wall of the ingredient that takes over the function of a liquid-interaction retarding barrier such that a liquid can not immediately interact with the bulk of the ingredient, but the outer surface 9 thereof has not dissolved or otherwise become permeable first. An example thereof is a crusty shell of a compacted block of coffee powder that encloses loose coffee powder, wherein the crusty shell delays the interaction between water coming from outside and the bulk of the coffee powder.

Therefore the delay of the production of the second beverage component can be achieved by a chemical and/or physical treatment of the ingredient for the second beverage component, especially a treatment of the surface of said ingredient.

In contrast thereto, FIGS. 1 and 2 show possibilities how the delay can be achieved by a separation of the ingredient for the second beverage component.

A capsule as shown in FIGS. 1 to 3 is particularly suited to produce a cappuccino-style beverage based on a single dosing capsule. To this regard the main compartment 2 will preferably contain a milk powder component, while the compartment 3, 3' in which the beverage production is delayed, can contain coffee powder and/or a coffee powder/sugar mix.

In that case a milk creamer is dissolved first, providing a white foam. The coffee beverage component is released after some delay and will be poured under the white foam surface.

Especially for such a cappuccino capsule it is preferred to make the separation walls 4, 4' of a sugar-based material, such as hard candy. The walls can also contain maltodextrin to adjust the resistance to cracking of the hard candy.

The coffee powder can, for example, be standard spray-dried or freeze-dried coffee powder.

In the compartments 3, 3', the encapsulated coffee is well protected against water introduced into the volume of the capsule 1 and its hydration is delayed. The milk powder-based creamer outside the "coffee candy" 3, 3' will dissolve first and give a white foam on the surface of the drink. Then the sugar-based shell can dissolve which allows, in turn, the coffee powder contained therein to dissolve and to form the coffee part of the beverage.

In a further embodiment the separation walls 4, 4' are made from sucrose and glucose syrup.

The inner compartment(s) can have an e.g. oval shape with a dimensions of the main axes of 30 and 20 mm, respectively.

Note that the sub-compartments 3, 3' need not to be filled completely with the beverage ingredient. A filling ratio of 15 to 30%, preferably 20 to 25% has been found as appropriate.

The thickness of the separation walls 4, 4' can be for example 1 to 3 mm along the longer dimension of the oval shape and 3 to 5 mm on the shorter length. In other words, the wall thickness is not constant on all sides of the separation 4, 4' enclosing the compartments 3, 3'.

In order to reduce the risk of a breaking of the separation walls 4, 4', the moisture content of the walls can be set to more than 1% by weight and preferably 2 to 5% by weight. Also the addition of maltodextrin can be helpful to reduce the breaking risk.

The (total) volume of the capsule can be between 20 ml and 60 ml, preferably between 30 and 45 ml.

The capsule can contain a total of 10 to 30 grams, preferably 15 to 20 grams of beverage ingredients (including the weight of the separation walls 4, 4').

For a cappuccino-styled beverage it had been found that a milk powder amount in the range of 5 to 15 grams, a coffee powder content in the range of 2 to 5 grams and a total sugar content in the range of 2 to 6 grams gives a good-tasting product.

The technology for producing such a capsule can for example be taken from the known technologies for producing centre-filled hard candy.

To this regard a so-called batch former with powder filler technology is used.

In the batch forming process a sugar mass (being the constituting material for the separation walls) is cooked and kneaded to a semi-plastic state and then placed onto rotating conical rollers (the batch roller). A centre filling pipe is positioned in the cone of sugar formed in the batch roller. The beverage ingredients to be filled into the capsule sub-compartments are fed into the centre filling pipe using for example an auger. As the semi-plastic sugar mass flows over the end of the centre filling pipe, an orifice is created in the sugar mass which extrudes into a pipe and is filled by the powder flowing from the centre filler pipe.

The filled sugar rope is then fed into a rope sizer to produce a rope with consistent diameter and velocity to match the forming die's inputs. The forming dies cut the product rope, seal the powder inside the hard candy shell and press out the appropriate product shape. Finally, the product is cooled and the resulting filled sub-compartments can then be placed into the capsule 1, which can then in turn be sealed.

Figure 4:
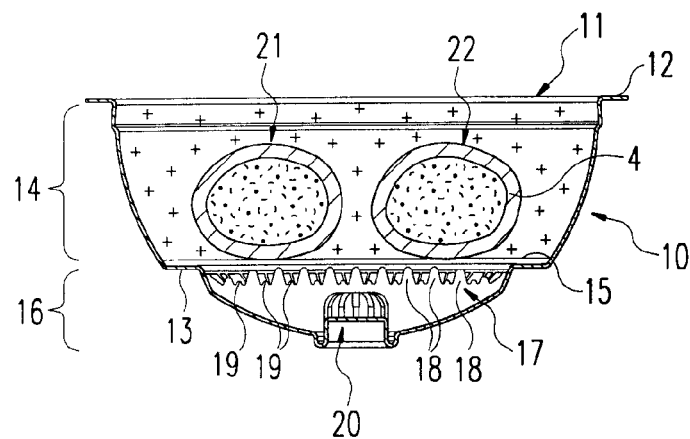
FIG. 4 shows a further embodiment of the capsule of the invention before water is injected under pressure into the outer compartment comprising a first ingredient; the capsule comprising two second compartments enclosing one or more second ingredient(s)
Figure 5:
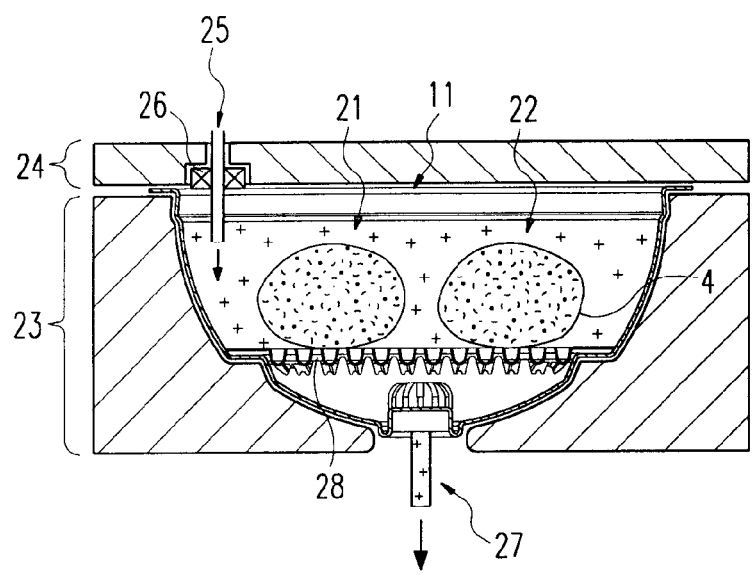
FIG. 5 shows the capsule of FIG. 4 when the first ingredient dissolved in a liquid is delivered from the capsule before the second compartments are dissolved or melted by the liquid.
Figure 6:
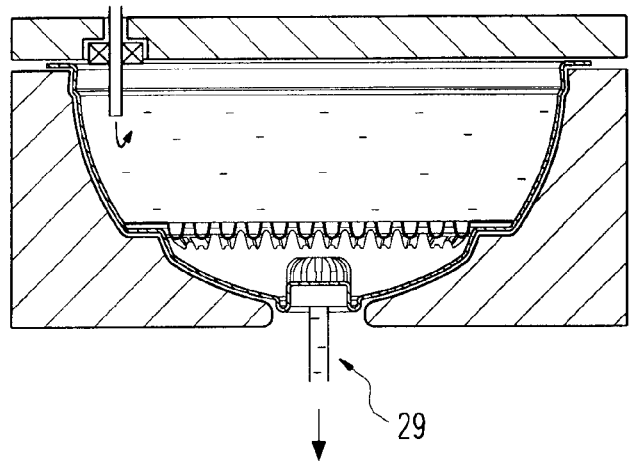
FIG. 6 shows the capsule of FIG. 4 when the second ingredient(s) (dissolved in a liquid) is delivered from the capsule.

Another embodiment of the capsule of the invention is illustrated in FIGS. 4 to 6.

The capsule according to this embodiment of the invention comprises opening means that opens to deliver the beverage when a sufficient opening pressure has been reached inside the capsule. A detailed description of the opening system is described in patent applications WO 03/059 778 and EP 1 500 358 A1; the contents of which are incorporated to the present application by reference.

The capsule of FIG. 4 generally comprises a cup 10 and a puncturable lid 11 such as a membrane that is welded along a peripheral welding edge 12 to the periphery of the cup. The cup comprises an internal shoulder 13 that defines the limits of an upper compartment 14. At the shoulder is welded a membrane 15 that forms the pressure retaining means of the capsule. The combination of the lid 11, upper compartment 14 and membrane 15 forms the closed chamber of the capsule that is pressurized upon injection of a sufficient amount of fluid under pressure.

Means allowing opening of the retaining means, i.e., the membrane 15 is arranged in a lower housing 16 of the cup right under the membrane. This means can consist of a puncturing element 17 in the shape of a plate seating in the lower housing 16 and which co-acts in relative engagement with the membrane 15 of the cup when a fluid is injected under pressure in the upper compartment 14.

The puncturing element or plate 17 may preferably comprise one or more protrusions. More preferably, the element comprises a multitude of protrusions 18 distributed over the upper surface of the element and directed toward the membrane 15. Between the protrusions are defined channels or recesses 19 enabling the liquid to flow and leave the capsule. The channels 19 may form different pattern depending on the shape and positioning of the protrusions. They can form a crossed pattern and thus separate at least partially the protrusions 18. At the lower centre of the capsule is provided a beverage outlet 20 for the release of the beverage.

One improvement to the capsule of the cited patent applications lies in having at least a second compartment 21, 22 encased inside the main or upper compartment 14. The second compartments 21, 22 are compartments that are arranged to release the ingredients or mixture of ingredients at a delayed time relative to the compartment 14 when liquid is introduced in the capsule.

For example, each compartments 21, 22 consists of a hard candy casing formed of a carbohydrate wall 4 or other water dissolvable material as aforementioned into which is encased soluble ingredient(s). Another ingredient is positioned in the main compartment 14 outside the hard candy casings. For example, the soluble ingredient in the casings 21, 22 comprises soluble coffee and the ingredient outside the casing comprises a creamer powder e.g., dairy and/or non dairy creamer.

FIG. 4 shows the capsule before water is injected in the capsule. As it can be noted, the casings 21, 22 form a physical separation between the two ingredients, e.g., soluble coffee and creamer.

FIG. 5 shows the beginning of the beverage preparation method. The capsule is inserted in a beverage machine that, for example, comprises a capsule holder 23 and water injection system 24. The water injection system includes a water injector 25 that is configured to introduce water under pressure inside the capsule, for example, a hollow pipe that punctures or otherwise breaks the lid 11 of the capsule. A seal 26 is able to maintain a tight introduction of the fluid inside the capsule. Water can be injected at any possible site, for example, an offset point or a more central point in the lid. However, it is suitable the water injector 25 is positioned to not perforate the casings 21, 22 upon being introduced inside the main compartment. As water is introduced inside the compartment, the ingredient contained in said compartment starts interacting with water and a first liquid component 27 is prepared and dispensed. Typically, the casings 21, 22 also start dissolving or melting but no to a point sufficient where liquid can interact with the second ingredients contained inside the said casings.

After a few seconds, a certain pressure is reached inside the capsule which is sufficient to cause the opening of the complementary opening means of the capsule. In particular, the inside pressure forces the retaining means, i.e., membrane 15 to rupture against the puncturing elements 17. The opening pressure threshold is defined by the factors like the membrane thickness, material, shape/number of protrusions, etc. As a result, the first beverage component 27 can be drained through the torn/cut membrane 15, via small perforations/holes 28 and through the beverage outlet. The opening pressure may be comprised within a range of from 1 to 20 bar of relative pressure.

It must be noted that the opening of the capsule, i.e., puncturing of the membrane should preferably occur before the casings have melted sufficiently to enable the second ingredient(s) to interact with water; therefore, avoiding a mixture of the two different beverage components and undesirable release of the two together, at least, during a significant overlapping period of time.

1. FIG. 6 shows the final stage at which, the casings 21, 22 have finally dissolved or melted and water can interact with the second ingredient(s) in order to prepare a second beverage component(s) 29. Consequently, the second beverage component is also drained through the perforated membrane 15 and through the outlet.

The invention claimed is:

1. A closed, sealed container for containing at least one beverage ingredient to produce a beverage when combined with a liquid injected under pressure into the container when the container is inserted into a beverage machine, which comprises an external wall or walls made of a liquid impermeable material and configured to withstand internal pressures greater than atmospheric pressure and retain a liquid pressurized above atmospheric pressure in the container, and at least first and second separated compartments therein, each compartment containing an ingredient or a mixture of ingredients that is different from that contained in the other compartment, wherein the first compartment is configured, dimensioned and arranged to release the ingredient or mixture of ingredients at a delayed time relative to the second compartment when liquid is introduced under pressure into the container to prepare the beverage, wherein the pressure of the injected liquid creates an interior pressure that is greater than atmospheric pressure in the first compartment and the interior pressure build-up contributes to the delayed release of the ingredient or mixture of ingredients.

2. The container according to claim 1, wherein the second compartment is configured to surround the first compartment.

3. The container according to claim 2, wherein the first compartment contains a coffee ingredient and the second compartment contains milk powder, liquid milk concentrate or a non-dairy creamer in liquid or powdered form.

4. The container according to claim 2, wherein the first compartment is demarcated or bounded by a wall containing a water dissolvable material.

5. The container according to claim 1, wherein the compartments are separated from each other by an internal wall which is designed to open and provide fluid communication between the compartments when interacting with a liquid that is pressurized to a pressure that is above atmospheric pressure and injected into the interior of the container.

6. The container according to claim 5, herein the internal wall is constituted by an outer surface of an ingredient forming a solid wall enclosing the bulk of the same ingredient in one of the compartments.

7. The container according to claim 5, herein the internal wall has a thickness of at least 0.5 mm and is made of a hard candy.

8. The container according to claim 5, herein the internal wall has a varying thickness.

9. The container according to claim 5, wherein the internal wall is a hard candy that is filled with a beverage ingredient.

10. The container according to claim 5, herein the internal wall contains sucrose syrup, glucose syrup, other polysaccharides or mixtures thereof.

11. The container according to claim 5, herein the internal wall further contains maltodextrin.

12. The container according to claim 5, herein the internal wall contains at least 1% but no more than 6% by weight water.

13. The container according to claim 1, wherein the compartments are separated from each other by an internal wall which is made from a material which dissolves when exposed to a liquid.

14. The container according to claim 5, wherein the container is a capsule having a total volume of between 20 ml and 60 ml and contains a total of 10 g to 30 g of beverage forming ingredients.

15. The container according to claim 5, wherein the second compartment includes opening means that opens under pressures greater than atmospheric pressure when water is injected in the compartment.

16. A method for producing the closed, sealed beverage-containing container of claim 1, which comprises:
    filling a central portion of a shell with a beverage ingredient in order produce a first compartment containing the beverage ingredient,
    arranging the compartment inside the container having a larger volume than that of the first compartment so that the first container surrounds the compartment to form the second compartment for containing a beverage ingredient that is different from that contained in the first compartment, and
    providing the container with the external wall or walls so that the container is able to withstand internal pressures greater than atmospheric pressure and retain a liquid under pressures greater than atmospheric pressure therein.

17. The method according to claim 16, wherein the filling is accomplished using a batch former with a powder filler.

18. A method for producing a beverage or liquid comestible from a single closed, sealed container, which comprises:
    providing a closed container having separated ingredients therein, with the container having an interior that contains first and second different separated ingredients therein, with the container having an external wall or walls made of a liquid impermeable material and configured to withstand internal pressures greater than atmospheric pressure and retain a liquid under pressures greater than atmospheric pressure therein,
    inserting said container into a beverage machine and injecting a liquid under pressure into the container in order to start to produce a first beverage component from the first ingredient, and
    producing a second beverage component from a second ingredient after a time delay from the start of the production of the first beverage component due to the arrangement of the second ingredient in the container as additional liquid is injected under pressure into the container,
    wherein the pressure of the injected liquids creates an interior pressure that is greater than atmospheric pressure and the interior pressure build-up helps to contribute to the delayed production of the second beverage component.

19. The method according to claim 18, wherein the time delay is achieved by a chemical or physical treatment of the ingredient for forming the second beverage component.

20. The method according to claim 18, wherein the delay is achieved by a physical separation of the ingredient for forming the second beverage component.

21. The method according to claim 18, wherein the container is provided with more than one compartment with each compartment respectively containing a different beverage ingredient.

22. The method according to claim 21, wherein initially the compartments are separated from each other by an internal wall which perforates or at least partially disappears as liquid that is pressurized to a pressure that is above atmospheric pressure is injected into the container.

23. The method according to claim 22, wherein the internal wall at least partially melts when exposed to hot liquid that is pressurized to a pressure that is above atmospheric pressure and injected into the container.

24. The method according to claim 18, wherein the container opens to release the first beverage component after a certain pressure that is above atmospheric pressure has been reached therein.

25. The method according to claim 18 wherein the container is a single capsule that includes a first compartment containing a milk ingredient and a second compartment containing a coffee ingredient, so that when water that is pressurized to a pressure that is above atmospheric pressure is injected into the capsule, a first beverage component on the basis of the milk ingredient is prepared and drained, and after a time delay from the start of the production of the first beverage component, a beverage component is produced on the basis of the coffee ingredient and drained to combine with the first beverage ingredient to form a cappuccino-style beverage from the single capsule.

* * * * *